United States Patent [19]

Simpson et al.

[11] 4,203,416
[45] May 20, 1980

[54] MEANS FOR HOLDING A COOKING VESSEL IN POSITION ON A BURNER GRATE

[75] Inventors: Ralph E. Simpson, Upland; Michael L. Simpson, Ontario, both of Calif.

[73] Assignee: Simpson Enterprises, Upland, Calif.

[21] Appl. No.: 855,026

[22] Filed: Nov. 25, 1977

[51] Int. Cl.² ............................................. F24C 15/10
[52] U.S. Cl. ....................................... 126/212; 294/28
[58] Field of Search ............... 126/212, 113, 211, 227, 126/230, 238, 24; 74/99; 24/3 J; 294/28, 31, 16

[56] References Cited

U.S. PATENT DOCUMENTS

| | | | |
|---|---|---|---|
| 168,809 | 10/1875 | Timby | 126/24 |
| 691,364 | 1/1902 | Denckla | 24/3 J |
| 1,623,679 | 4/1927 | Hosler | 294/28 |
| 1,645,466 | 10/1927 | Westlake | 126/24 |
| 2,379,206 | 6/1945 | Westlake | 126/24 |
| 2,448,417 | 8/1948 | Cecchini | 126/211 |
| 2,844,913 | 7/1958 | Brill, Jr. | 24/3 J |
| 3,198,189 | 8/1965 | Oatley | 126/211 |
| 3,515,116 | 6/1970 | Finnstrand | 126/211 |
| 3,937,510 | 2/1976 | Sang Lew | 294/16 |

Primary Examiner—Albert W. Davis
Assistant Examiner—Wesley S. Ratliff, Jr.
Attorney, Agent, or Firm—John H. Crowe

[57] ABSTRACT

A device for holding a pot on a gas range burner in a moving recreational vehicle. The device is attachable to a burner grate of the type having radial bars with sloping lower edges, and it has a deck with lateral edges that interfit with a neighboring pair of the radial bars so as to support the deck on the bars and permit it to span the space between them. A pair of locking levers are pivotally supported at a common point under the deck. From their common pivot point, the locking levers extend forwardly and terminate in outturned, downwardly offset feet designed to swing outwardly into frictional contact with the lower edges of the neighboring radial bars from points intermediate the bars. To the rear, the locking levers are formed into a pair of handles. Mounted above the deck on a pair of pivoted brackets are two clamping members with forward portions formed into curved arms for embracing the pot, and rear portions serving as handles. Two springs interconnect the handles of the locking levers with the pivoted brackets in a manner to exert closing pull on the clamping members and opening pull on the locking levers. The device is attached to two neighboring radial bars on a suitable burner grate for use by means of the locking lever feet, after which its clamping members can be opened by hand to receive a pot and hold it over the grate.

10 Claims, 7 Drawing Figures

U.S. Patent  May 20, 1980  Sheet 1 of 2  4,203,416
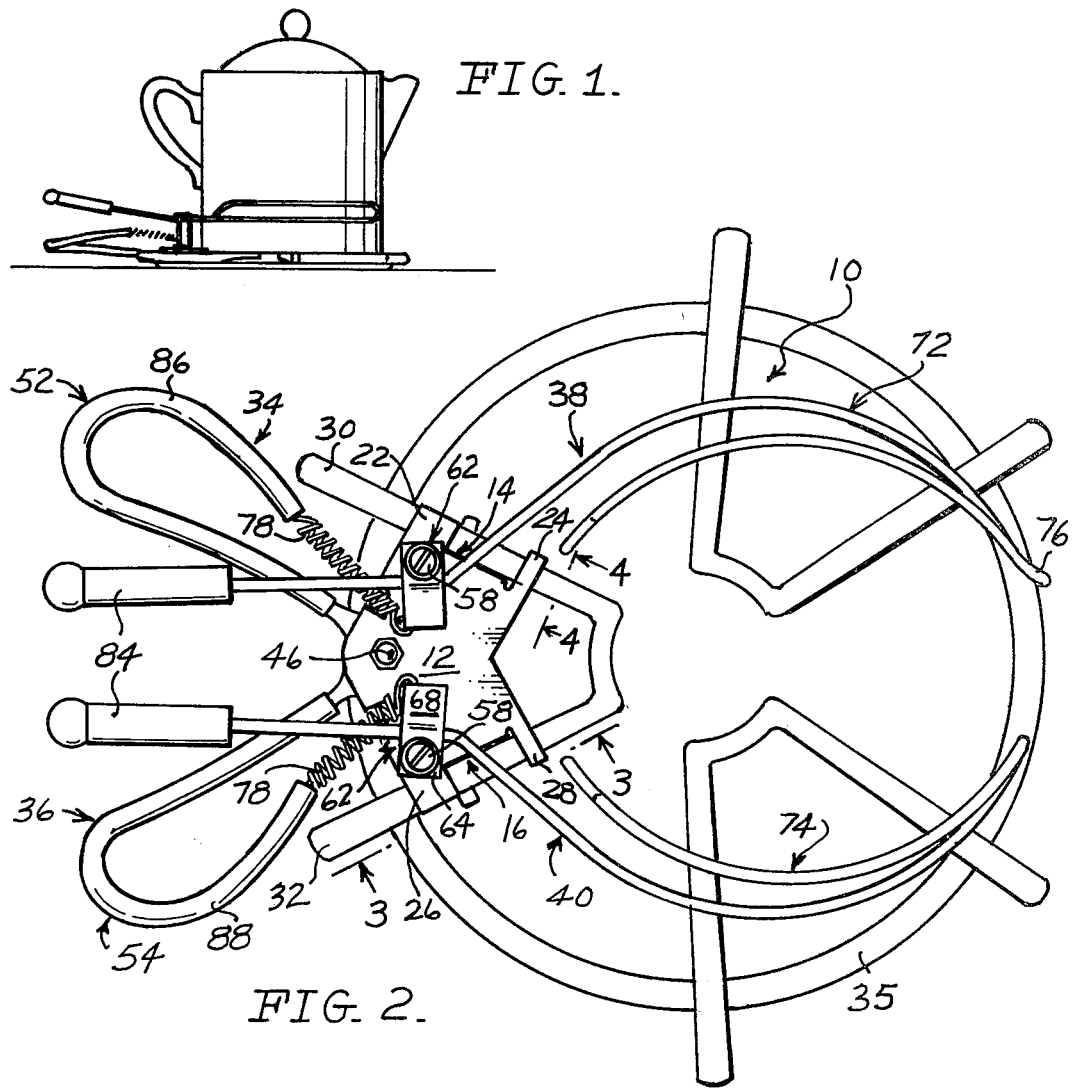
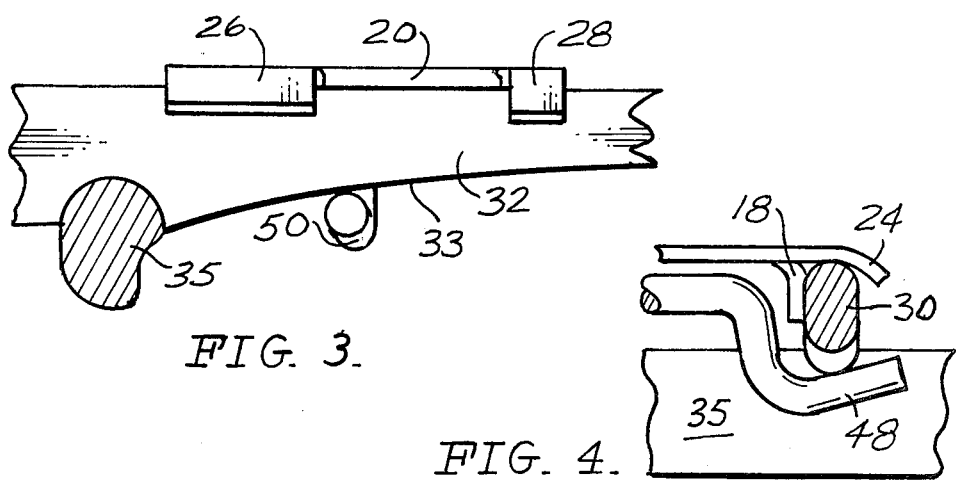

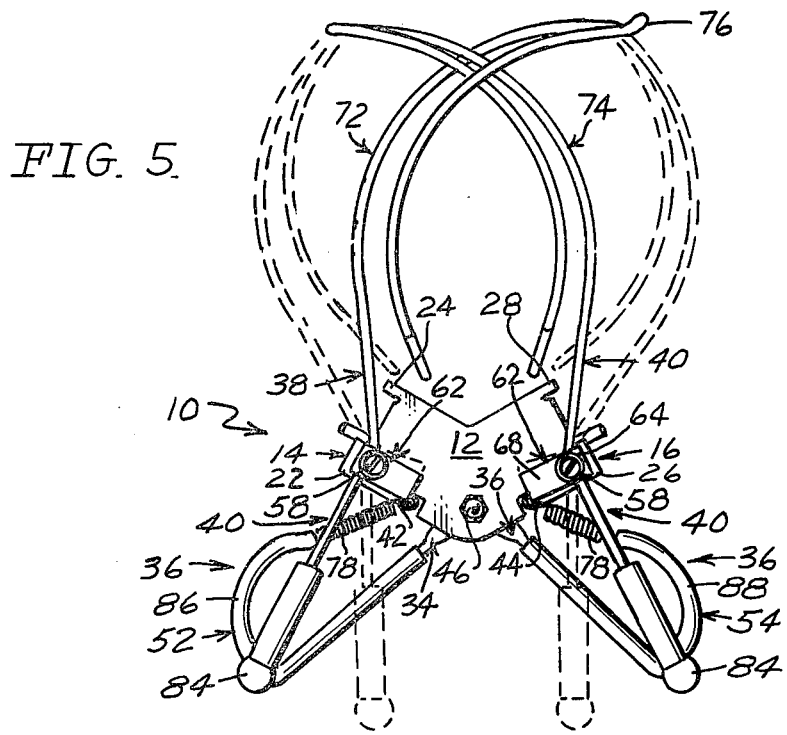
FIG. 5.
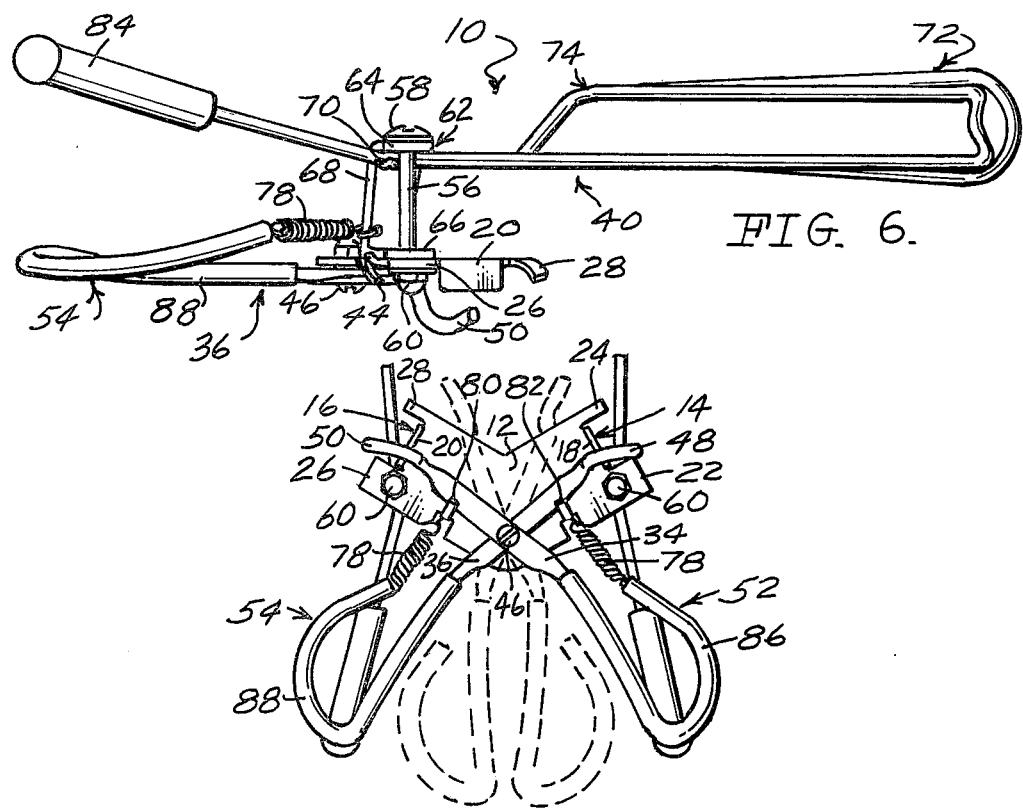
FIG. 6.
FIG. 7.

MEANS FOR HOLDING A COOKING VESSEL IN POSITION ON A BURNER GRATE

BACKGROUND OF THE INVENTION

This invention relates generally to pot holding means and more particularly to such means for holding coffee pots and the like against sliding or tipping movement on gas range burner grates in moving recreational vehicles and boat galleys.

The making of coffee, cooking of foods, etc., on boats and ships poses special problems because of the many movements to which such vessels are subjected, particularly in the open sea. One such problem results from the tendency of pots on galley ranges to move off of burner grates under the influence of these movements. Also, galleys, and particularly those on smaller boats, are generally so small that there is barely room for the cook to move about, and this creates a risk of accidental tipover of cooking vessels on range burners. Similar problems and difficulties exist in recreational vehicles equipped with gas ranges for cooking, particularly when the ranges are in use while the vehicles are in motion. Even when such a vehicle is parked or standing still, there is some danger that a pot of coffee, boiling water, or the like, on a range burner therein will be accidentally knocked over, particularly where children are present, because of crowded conditions in its kitchen area.

Heretofore various contrivances for keeping pots in position on burner grates in galleys and recreational vehicles have been provided. All such devices of which we are aware, however, have had shortcomings of one kind or another. One commercially available device of this type is simply a tubular member that snaps onto a stove grate to receive a pot and keep it in position over the grate. The tubular member, however, has a fixed diameter, and is therefore unsuitable for use with pots having larger diameters than that. Furthermore, unless the pot diameter is such that there is a reasonably snug interfit between the pot and holder, the pot can slide around within the holder—an obvious disadvantage. Finally, the device must be snapped into position on a grate for use, which does not contribute to its ease and facility of handling, particularly after it has been heated up by a stove burner.

Another prior art means for the prevention of movement of a vessel on a range burner is embodied in a tea kettle having three equidistant fins on its bottom. These fins fit down into the grillwork of the grate to keep the kettle from sliding off of the burner. The fins do not, however, prevent the kettle from tipping. Moreover, while the fins might prevent the kettle from sliding completely off of a burner grate, they do not always fit into the grate snugly enough to prevent at least some sliding movement thereon. This expedient leaves much to be desired in the way of versatility, being limited in use to a single vessel and to burner grates of suitable design to accept the fins on that vessel.

Another previously proposed means for holding pots in position over range burners includes one or more rails designed for mounting on the sides of ranges and cooperating pairs of clamping members adapted to extend inwardly over burner areas from the rails, the clamping members being slidably mountable on the rails so as to be movable therealong. Each pair of clamping members can be positioned to embrace a pot over a burner and hold it tightly against movement. Disadvantages of this type of pot holder reside in the fact that it is more or less a permanent installation on a range to clutter an already cramped working space still more, and the further fact that the clamping members must be moved each time a pot is placed on a burner or removed therefrom so long as they are in service. This need for constant manipulation of the clamping members makes their use burdensome and tedious, and sometimes uncomfortable, or even painful, when the clamping members become hot from exposure to burner environments.

Still another type of pot holding means heretofore known comprises a plurality of pairs of cooperating parts, each pair including a first part that snaps into position on a burner grate and a second part that thereafter interfits with the first part, the second part being bent sharply upwardly at one end to provide a barrier for retaining a pot or pan against radial movement from its position over the burner. A plurality of these pairs of interfitting parts, typically four pairs, are affixed to the burner grate so that their upstanding ends bound a space above the burner within which a cooking vessel can snugly fit. In order to use this type of pot or pan restraining means, it is, of course, necessary to install a plurality of parts on at least one burner grate to provide a confined area for a vessel of specific diameter, after which the grate is limited to occupancy by such a vessel until the installed parts are removed, an even more tedious task than adjustment of the clamping members attached to the above-described rails.

One other type of pot holding means of which we are aware includes a holding bracket for an adjustable clamp, which bracket is permanently attachable to a wall or countertop adjacent a range burner to permit use of the clamp over that particular burner. The obvious disadvantage of this device is its limitation to a specific location for use, plus the fact that it is a permanent installation to occupy space in the limited area available for cooking in the cramped quarters of the average boat or recreational vehicle. Another disadvantage is the necessity of adjusting the clamp to a pot gripping position every time it has to be used, and to a pot release position when the pot is to be removed from the burner.

The above-described pot holding means pretty much typify those types of equipment commercially available for preventing accidents due to pot movement in the crowded cooking areas of boats and recreational vehicles, particularly during periods when such vehicles are in motion. While these prior art pot holding means serve their collective purpose after a fashion, each is subject to one or more of the following disadvantages: limitation to use on either a specific vessel or a vessel of specific size, inability to prevent all types of pot movement, being a more or less permanent installation taking up needed space in a cramped cooking area, requiring bothersome adjustment to a vessel for use and for removal after such use, requiring the installation of multiple parts for use on a burner and limitation to use at a particular burner location. All of the foregoing disadvantages would be eliminated by the provision of a pot holding means that could be quickly and easily attached to a burner grate for use and then as quickly and easily clamped around any of a variety of pots of different sizes to thereafter prevent movement of the pot, from which the pot could later be quickly and effortlessly removed, and in which the pot holding means could be quickly and effortlessly removed from the grate after it had served its purpose. No such pot holding means has heretofore, however, been proposed to our knowledge.

SUMMARY OF THE INVENTION

It is a principal object of this invention to provide simple, foolproof means for holding a cooking vessel in position over a burner in a recreational vehicle or on a galley range to prevent movement of the pot under the influence of vehicular movement.

It is another object of the invention to provide such means that can be quickly and easily stationed at a burner grate for use as needed and as quickly and easily removed from the site after it has served its purpose so as to leave the area free of clutter when it is not needed, and which requires no bothersome installation or removal procedure to accomplish these ends.

Still another object of the invention is to provide such means that is equally suitable for use with vessels of any of a variety of sizes.

Other objects, features and advantages of the invention will become apparent in the light of subsequent disclosures herein.

We have succeeded in accomplishing the above, and other objects, and thereby overcoming the above-noted disadvantages of prior art pot holding means by providing a pot holder of unique design that can be removably attached to a burner grate for use, and removed therefrom when no longer needed, by simply manipulating a pair of handles similar to those on a pair of scissors. Briefly, the pot holder, in its preferred form, has a deck shaped to fit between two consecutive radial bars of a conventional burner grate and engage the bars in such fashion as to span the space therebetween and support a pair of locking levers beneath, and a pair of clamping members above it. The locking levers are pivotally mounted at a point underneath the center of the deck, near its rear edge, and extend forwardly from this point to terminate in downwardly offset, outwardly turned feet positioned to move arcuately away from proximity to each other into frictional engagement with the undersides of the radial bars and thereby clamp or lock the deck in position on the bars. To the rear, the locking levers are shaped into handles somewhat like those on a pair of scissors or tongs.

The clamping members above the deck are mounted on a pair of symmetrically positioned brackets pivotally supported on the deck to swing forwardly from terminal positions at the rear of the deck through which they are prevented from swinging in the opposite direction by integral stop means on the deck. From their points of attachment to the brackets, the clamping members extend forwardly in the form of curved arms that are designed to embrace any of variously sized cooking vessels, and to the rear the clamping members are shaped into handles for manual control thereof. The pivoting brackets are connected to the respective handles of the two locking levers by means of a pair of spiral tension springs in such a way that the springs exert closing force on the clamping members, through the brackets, and opening force on the locking levers.

Our novel pot holding means can be temporarily attached to any conventional grate with radial bars by simply squeezing the locking lever handles together, against the force of the two springs, until the feet of the levers fit between two neighboring radial bars on the grate, and then engaging the lateral edges of the deck with the bars and releasing the handles of the locking levers. When the locking lever handles are released, the springs pull the levers apart and their outturned feet swing outwardly into frictional contact with the lower edges of the bars to lock the pot holder in position on the grate. The handles of the two clamping members can then be squeezed together until the forward portions (curved arms) of those members open wide enough to admit a pot or other cooking vessel therebetween. When it is placed between the curved arms and the handles are released, the springs pull said arms into snug embrace of the vessel. The design of the pot holder is such that the vessel is now positioned over the burner, and held firmly against slippage or other movement until the clamping members are opened to permit its removal from the burner. As will be evident, the two springs serve the dual purpose of holding the device firmly in position on the grate and preventing movement of the vessel embraced by the clamping members. Obviously, the larger the cross-section of the vessel, the more firmly will the springs hold the device in position on the grate and the vessel in position on the burner.

BRIEF DESCRIPTION OF THE DRAWINGS

FIG. 1 is a side view of a pot holder of preferred form in accordance with this invention mounted on the grate of a stove burner and holding a coffee pot in position on the grate.

FIG. 2 is an enlarged top view of the pot holder clamped to the grate, showing a pair of clamping members forming a part thereof in an open position.

FIG. 3 is a further enlarged fragmentary side view of a radial bar forming a part of the grate and portions of cooperating parts of the pot holder in gripping engagement with the bar, to illustrate the manner in which the pot holder is mounted on the grate, taken along line 3—3 of FIG. 2.

FIG. 4 is another fragmentary view, partly in section, of a second radial bar and parts of the pot holder in gripping engagement therewith, to further illustrate the manner in which the pot holder is mounted on the grate, taken along line 4—4 of FIG. 2.

FIG. 5 is a top view of the pot holder, drawn to a scale reduced from that of FIG. 2, showing in solid and dashed lines, respectively, closed and open positions of said pair of clamping members on the pot holder.

FIG. 6 is a side view of the pot holder, drawn to substantially the same scale as FIG. 2.

FIG. 7 is a fragmentary bottom view of the pot holder, drawn to substantially the same scale as FIG. 5, showing in solid and dashed lines, respectively, two positions of a pair of locking levers forming a part thereof.

DESCRIPTION OF PREFERRED EMBODIMENTS

Considering now the drawings in greater detail, there is shown generally at 10 (FIGS. 2, 5 and 6) a pot holder of preferred form in accordance with this invention. Pot holder 10 is formed with a deck 12 below which are pivotally mounted a pair of locking levers 34 and 36 and above which are mounted, in a manner hereinafter described, two clamping members 38 and 40, respectively. The deck 12 is designed to fit between two neighboring radial bars on a stove grate provided with such (radial) bars, and span the distance therebetween. The manner in which the deck 12 fits between the two bars is illustrated in FIG. 2, which shows a neighboring pair of such bars at 30 and 32, respectively.

Deck 12 is somewhat V-shaped to best accommodate the space it occupies on the grate, and it has a pair of angled lateral edges 14 and 16, each provided with a downturned flap intermediate two flanking outstretched segments. See, in particular, FIGS. 2-4 and 7, where the downturned flaps of the lateral edges 14 and 16 are shown at 18 and 20, respectively, and the flanking outstretched portions are shown at 22 and 24 for lateral edge 14 and at 26 and 28 for lateral edge 16. As FIGS. 3 and 4 illustrate, the outstretched portions of the lateral edges of deck 12 curve slightly downwardly toward their outer limits. These lateral edge configurations permit the deck 12 to interfit with a pair of cooperating radial bars in a burner grate in such fashion that the deck can be wedged into position between the bars with the conventional flaps at its edges abutting the confronting sides of the bars and the outstanding, downwardly curving portions flanking said flaps looped over the bars to thereby support the deck on the bars. FIG. 4 best illustrates this cooperating relationship between the deck and grate bars where the interfit between the lateral edge 14 of the deck and radial bar 30 is shown.

The aforesaid locking levers 34 and 36 are pivoted at 46 by means of a screw passing through the deck 12 secured in position by a nut, in the manner illustrated in FIG. 6. These levers extend forwardly from the pivot point 46 and terminate in a pair of downwardly offset, outturned feet 48 and 50, respectively. Rearwardly of the pivot point 46, the locking levers are shaped into a pair of looped handles 52 and 54, by means of which they can be manipulated by hand similarly to the way a pair of scissors or tongs is manipulated.

Mounted atop deck 12 at symmetrically opposite rear corners are two identical posts 56, each having a slotted head 58 at the top. The lower ends of these posts extend through the deck 12, and on each there is a nut 60 tightened snugly against the lower side of the deck, the post being properly threaded to receive this nut. Pivotally mounted on each of the posts, so as to swing arcuately thereabout, is a C-shaped bracket 62 formed with parallel upper and lower arms from a strip of hard metallic material and positioned with its upper arm flush against the lower side of the head 58 of its cooperating post and its lower arm flat against the upper surface of deck 12, the upper and lower arms being apertured to provide snug fitting openings for the post. The upper arm of each of the brackets 62 is shorter than its lower arm, and integral with these arms is an intermediate bracket segment sloping steeply downwardly from the upper arm to the lower, see FIGS. 2, 5 and 6, where the upper arm of one of the brackets is shown at 64, its lower arm is shown at 66 and its intermediate segment at 68. Where the upper arm and intermediate segment of each of the brackets join, there is a bend, and a separate one of the clamping members 38 and 40 is soldered to each bracket in the hollow of this bend, as can best be seen at 70 in FIG. 6 showing clamping member 40 so soldered. The deck 12, locking levers 34 and 36, brackets 62 and clamping members 38 and 40 are all of metallic construction, and preferably, but not necessarily, of chrome- or nickel-plated tempered steel construction, except for handle insulation means on the locking levers and clamping members soon to be described.

Each of the clamping members 38 and 40 is formed from heavy wire stock of sufficient strength and resiliency to maintain its physical integrity through long periods of use, which wire stock is shaped forwardly of its supporting bracket 62 into a curved arm designed to cooperate with the curved arm of the other clamping member to embrace a pot or other cooking vessel therebetween. In each case, the heavy wire forming the curved arm of a clamping member extends substantially horizontally forwardly from a bracket 62 to a forward terminus whereat it is bent upwardly through a U-turn. From there it runs back to a point short of the bracket 62, then is bent downwardly at an angle to termination in about the same plane as the plane of the lower part of the arm thus formed. The upper portion of each arm, extending backwardly from its forward end, angles slightly radially inwardly from front to rear, as seen from above, by comparison with the lower portion of the arm. This construction lends resiliency to the arms to permit them to embrace a cooking vessel with less rigidity, and greater shock absorbing effectiveness, than would otherwise be the case.

While the two curved arms of the clamping members 38 and 40 are of generally similar shape, they differ in certain respects, as can be seen in FIGS. 2, 5 and 6, which show the curved arm for clamping member 38 at 72, and for clamping member 40 at 74. More specifically, the spacing between the upper and lower portions of the curved arm 72 is sufficiently greater than that between the upper and lower portions of the arm 74 to permit close tolerance interfit of the latter (74) between the upper and lower portions of the former (72) in the manner illustrated in FIG. 5. Moreover, the forward, bight end of the arm 72 is bent slightly outwardly, as seen from above, so that the arm 74 can swing easily, without hindrance, into and out of an interfitting engagement therewith. This outward bend at the extremity of arm 72 can be seen at 76 in FIGS. 2 and 5.

A spiral spring 78 interconnects the end of each of the handles of the locking levers 34 and 36 with a separate one of the two brackets 62, in the manner illustrated in FIGS. 2, 5 and 6. The positional relationships of the involved parts are such that the two springs serve to simultaneously hold the feet 48 and 50 of the locking levers apart and the curved arms of clamping members 38 and 40 together in their solid line positions of FIG. 5. To prevent closing movement of the clamping arms beyond their solid line positions in FIG. 5, the deck 12 is bent upwardly at corresponding corners of a pair of symmetrical indentations in its rear edge to form a stop for each of the brackets 62, the two stops being shown at 42 and 44, respectively, on the drawings. The aforesaid indentations occur where two tongues have been cut in the rear edge of deck 12 either side of its longitudinal center line and bent downwardly and forwardly underneath the deck to form a pair of stops 80 and 82 for locking levers 34 and 36, respectively. These latter stops (80 and 82) serve to prevent opening movement of the locking levers beyond their solid line positions in FIG. 7.

To the rear of their points of soldered attachment to brackets 62, the clamping members 38 and 40 are bent slightly outwardly and upwardly, as seen in their normal positions of rest (the solid line positions of FIG. 5) to which they are restrained by springs 78, to form handles. A pair of insulating hand grips 84 are fitted onto the rear ends of these handles to protect the user's fingers against burning contact with hot metal after the pot holder has been employed over a range burner. These hand grips can be made of any suitable insulating material, such as wood or the like. For the same reason, an insulating cover of a suitable tubular plastic or other material is placed on the handles 52 and 54 of the locking levers, as shown at 86 and 88, respectively, on the drawings.

The manner in which pot holder 10 is employed should now, it is believed, be clear. Briefly, the device is temporarily mounted on a burner grate for use by first squeezing handles 52 and 54 of the locking levers together to their dotted line positions in FIG. 7, at which point the feet 48 and 50 of the locking levers can fit between two neighboring radial bars of the grate. The deck 12 is then fitted into position between two such bars until its lateral edges are wedged against the bars in the manner illustrated in FIG. 2 (where the two bars are the aforesaid bars 30 and 32), after which the locking lever handles are released to permit outward movement of the locking lever feet 48 and 50 under said bars.

Radial burner grate bars often have lower edges that slope downwardly in the outward direction. Sometimes the slope is of a slightly curving character, like that shown at 33 in FIG. 3 where bar 32 is fragmentarily illustrated, and extends to a grate ring arcuately intersecting the bars near their outer ends (which type of grate construction is exemplified in the drawings where the grate ring can be seen at 35). The feet of the locking levers swing outwardly, under the pulling influence of springs 78, when the locking lever handles are released, until they ride into contact with the downwardly sloping lower edges of radial bars 30 and 32. FIG. 3 shows foot 50 of locking lever 36 after it has reached this point. When the feet thus come into contact with the radial bars, the pot holder is locked in position on the grate. It is then a simple matter to squeeze the handles of the clamping members together to open curved arms 72 and 74 of those members wide enough to admit a pot or other vessel, place the pot or other vessel on the burner, and then release the handles to permit the curved arms to embrace it. The vessel is now held firmly in position on the burner until its removal is desired, after which the clamping member handles can again be squeezed together to free it for such removal.

While the novel pot holder of this invention has been herein primarily illustrated and described in what is considered to be a preferred embodiment, we wish to emphasize that the scope of the invention extends to all variant forms of that embodiment encompassed by the language of the following claims. For example, the pot holder could be made with locking lever feet designed to permit its use on burner grates having radial bars with eight straight or sloping lower edges (such as feet formed by downwardly sloping, outwardly extending forward portions of the locking levers). Other permissable variations from the illustrated form of the pot holder include pot holders with upwardly bent locking lever handles (to permit its convenient installation on certain galley ranges), pot holders with other than intermeshing clamping member arms (in which case, stops to limit closing of the clamping members beyond a desired point need not be provided if abutment of the closing clamping member arms serves the purpose of such stops), pot holders with adherent coatings of insulating material on their locking lever and clamping member handles in lieu of insulation such as that on the corresponding handles of illustrated pot holder 10, and pot holders differing in various ways from pot holder 10 so long as the resulting differences are of a noncritical character.

We claim:

1. Holding means particularly suitable for holding a cooking vessel in position over a range burner grate of the type having a plurality of radial bars, said holding means comprising, in combination:

generally flat deck means with lateral edge configurations that interfit with a neighboring pair of the radial bars so as to support the holding means thereon and permit the deck means to span the space therebetween;

a pair of locking levers adapted to pivot about a common pivot point intermediate their ends and means cooperating with said deck means to pivotally support the locking levers at such a point to permit lateral pivoting movement thereof below the deck means;

each of the pivoted locking levers being shaped to extend forwardly from said pivot point and terminate in a foot positioned and adapted to swing laterally outwardly under a separate one of the neighboring pair of radial bars until coming into contact with that bar as the locking levers swing to an open position about said pivot point, each of said locking levers also being shaped to extend rearwardly from the pivot point to form a handle therebehind;

a pair of clamping members respectively secured to a pair of cooperating brackets, and a pair of cooperating pivot means affixed to said deck means, said brackets being respectively mounted on said pivot means in pivoting relationship thereabout;

said clamping members having portions extending forwardly from said brackets in the form of arms adapted to embrace a cooking vessel and each clamping member having a portion extending rearwardly from its cooperating bracket in the shape of a handle;

spring means interconnecting said brackets and the handles of said locking levers in such manner as to normally exert simultaneous closing force on the clamping members above said deck means and opening force on the locking levers below said deck means whereby the handles of the locking levers can be squeezed together, against the pulling force of said spring means, until the feet of the locking levers are brought together to fit between a neighboring pair of said radial bars, and whereby said deck means can then be interfitted with the radial bars and the locking lever handles released to permit lateral movement of said feet, under the influence of said spring means, until the feet contact the bars to secure the holding means in position on said grate, and whereby the handles of said clamping members can then be squeezed together to open their forwardly extending arms to receive a cooking vessel, after which the clamping member handles can be released to permit said arms to close around such a vessel placed therebetween, under the pulling influence of said spring means, and thereby hold the vessel in position on said grate.

2. Holding means in accordance with claim 1 including first stop means for preventing opening movement of said locking levers under the influence of said spring means more than a desired amount to thereby facilitate the handling, storage and use of said holding means.

3. Holding means in accordance with claim 2 in which the arms of said clamping members are curved for convenient embrace of a cooking vessel of round cross-section.

4. Holding means in accordance with claim 3 in which the lateral edges of said deck means are each shaped with a downturned flap flanked by two outwardling extending segments whereby the lateral edges interfit with a neighboring pair of said radial bars with their downturned flaps adjacent the confronting sides of the bars and their outwardly extending segments overlying the top edges of said bars.

5. Holding means in accordance with claim 1 in which the curved arms of said clamping members are shaped from suitably heavy wire stock and extend forwardly from their cooperating brackets to their foward ends where, in each instance, the wire is bent upwardly and backwardly and extends rearwardly at a level above its forwardly extending segment to a point at which it is bent downwardly through an angle to termination free of contact with said forwardly extending segment at a point forward of its cooperating bracket.

6. Holding means in accordance with claim 1 in which the upper level segments of the curved arms of said clamping members angle radially inwardly from their forward to their rear ends, as viewed from above, to thereby lend a degree of resiliency to the arms and impart a shock-absorbing quality thereto.

7. Holding means in accordance with claim 6 in which the upper level and forwardly extending segments of one of said curved arms are sufficiently farther apart than the corresponding segments of the other arm, and the arms are sized and positioned, to permit interfit thereof for closure beyond a point at which said arms would otherwise come into opposing physical contact with one another.

8. Holding means in accordance with claim 7 including second stop means for preventing closure of said clamping members, under the influence of said spring means, beyond a desired limit.

9. Holding means in accordance with claim 8 in which said curved arms are of substantially equal degree of curvature and length and the forward end of the curved arm with the more widely separated upper level and forwardly extending segments is bent slightly outwardly from the curve path of said arm to thereby permit unhindered mating of the arms as they swing into interfitting relationship in their closing directions.

10. Holding means in accordance with claim 9 including heat insulating means on the handles of the locking levers and clamping members to minimize the risk of burnt fingers during usage of said holding means.

* * * * *